Feb. 9, 1943.                E. C. WENTZ                 2,310,886
                        WELDING TRANSFORMER
                        Filed April 29, 1942

WITNESSES:                                      INVENTOR
                                              Edward C. Wentz.
                                                  BY
                                              Franklin E. Hardy
                                                ATTORNEY Patented Feb. 9, 1943

2,310,886

UNITED STATES PATENT OFFICE 2,310,886

WELDING TRANSFORMER

Edward C. Wentz, Sharpsville, Pa., assignor to Westinghouse Electric & Manufacturing Company, East Pittsburgh, Pa., a corporation of Pennsylvania Application April 29, 1942, Serial No. 440,957

11 Claims. (Cl. 171—119)

My invention relates to an alternating-current welding system and, particularly, to an electric transformer for use in such a system and to the control means therefor for maintaining the welding arc within given current limits and to adjust the current range which those limits define.

It is an object of the invention to provide a transformer having a low open circuit voltage, but in which the effective induced voltage increases rapidly after the arc causing current flow from the transformer has started.

It is another object of the invention to provide an alternating-current welding transformer having a high range of reactance values for automatically varying the effective voltage of the welding arc without the use of current interrupting or switching devices in the alternating-current circuit or any moving parts in the transformer.

It is a further object of the invention to provide an alternating-current transformer having a direct-current circuit governed by the alternating-current load on the transformer for varying the transformer reactance.

Other objects and advantages of the invention will be apparent from the following description of certain preferred embodiments, reference being had to the accompanying drawing, in which.

Figure 1:
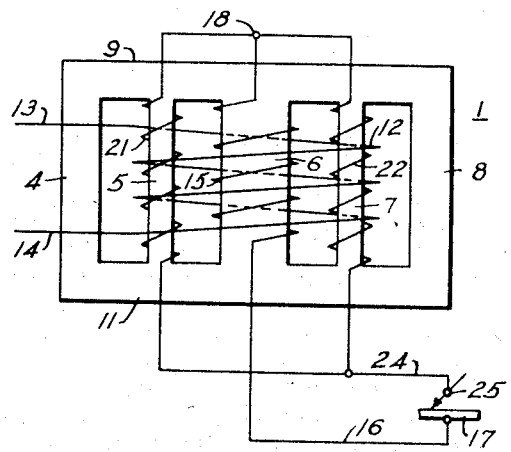
Figure 1 is a diagrammatic view of apparatus and circuits organized in accordance with the invention showing the arrangement of the transformer coils on the core structure.

Referring to Fig. 1, a core structure 1 is provided having a plurality of parallel leg members 4, 5, 6, 7, and 8 connected at their ends by yoke members 9 and 11. The three leg members 5, 6, and 7 are all winding leg members, the member 6 being the main winding leg member, and the members 5 and 7 being auxiliary winding leg members which operate in the nature of magnetic shunts.

The primary winding 12 connected between terminal conductors 13 and 14 surrounds all three winding leg members 5, 6, and 7. The secondary winding 15 is inductively related to the primary winding 12 through the main winding leg member 6. One terminal of the secondary winding 15 is connected through conductor 16 to one terminal of the welding arc 17, and the other terminal of the winding 15 is connected through junction point 18 and auxiliary winding 21 and 22 wound about the auxiliary winding legs 5 and 7, respectively, and through junction point 23 and conductor 24 to the other welding terminal 25. The auxiliary windings 21 and 22 are thus connected in parallel circuit relation to each other between the junction points 18 and 23 and in series with the main secondary winding 15 in such manner that the flux produced by the primary winding 12 causes the voltage developed in the auxiliary windings 21 and 22 to be in opposition to the voltage developed in the winding 15, so that the output voltage between the terminals 25 and 18 of the secondary winding circuit is substantially the difference of these two voltages. The design of the apparatus will be such that the voltages developed in the windings 21 and 22 will be somewhat less than the voltage developed in the winding 15 so that a low voltage will appear between the arc electrodes 17 and 25 where these electrodes are separated and no current is flowing in the secondary circuit. This output voltage is less than the voltage across the secondary winding 15 by the amount of the voltage across the auxiliary windings 21 and 22. Since the cross-sectional area of the auxiliary winding legs 5 and 7 of the core structure is much less than the cross-sectional area of the main winding leg 6, the auxiliary winding legs will saturate more rapidly upon the increase in current flow through the arc between the electrodes 25—17 so that upon closing the circuit and forming an arc, the voltage across the auxiliary windings 21 and 22 will rapidly decrease, and since this voltage is in opposition to the voltage of the secondary winding 15, the output voltage of the circuit increases.

Figure 2:
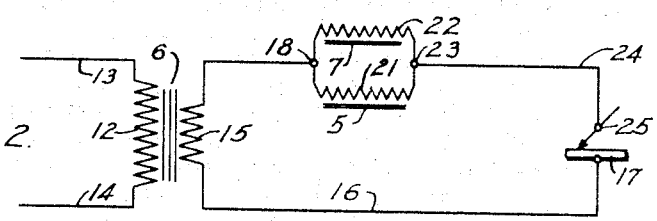
Fig. 2 is a diagrammatic view of the circuits corresponding to the apparatus shown in Fig. 1.
Figure 3:
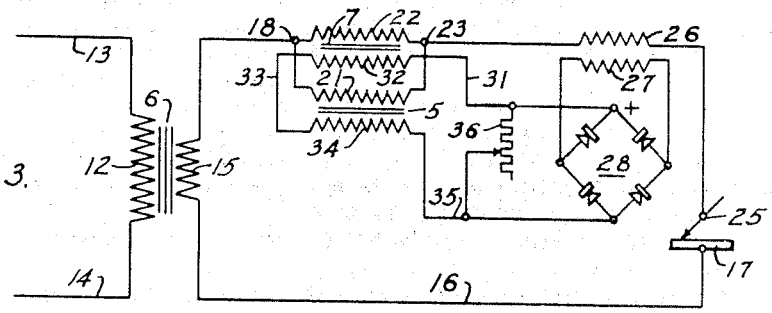
Fig. 3 is a diagrammatic view of a modification of the invention.

Referring to Fig. 3, the alternating-current circuit corresponds exactly to that shown in Figs. 1 and 2 except that a current transformer having a primary winding 26 and a secondary winding 27 is connected in the output or secondary circuit of the transformer for energizing a full-wave rectifier 28 with a voltage that is a measure of the secondary current from the main transformer to the arc. The rectifier 28 supplies a unidirectional voltage through a circuit including conductor 31, a saturating winding 32 wound about the auxiliary core leg 7, conductor 33, a saturating winding 34 wound about the auxiliary winding leg 5, and through conductor 35 to the other terminal of the rectifier 28. This unidirectional current circuit causes the winding core legs 5 and 7 to saturate much more rapidly upon an increase in current flow from the secondary winding 15 than in the circuit arrangement shown in Figs. 1 and 2 since, in addition to the increase in alternating current flowing through the windings 21 and 22 upon an increase in output current from the main transformer, there is also a corresponding increase in unidirectional current through the saturated windings 32 and 34. The particular value of this unidirectional saturating current may be adjusted by a rheostat 36 connected across the output terminals of the rectifier 28.

Figure 4:
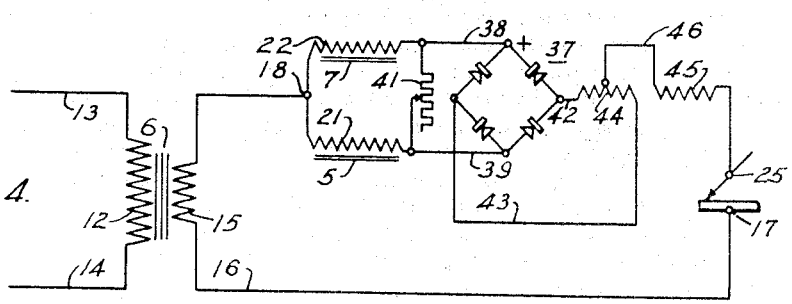
Fig. 4 is a diagrammatic view of another modification of the invention.

Referring to Fig. 4, a modification of the circuit shown in Fig. 3 is provided which differs therefrom essentially in that a full wave rectifier 37 is connected by conductors 38 and 39 between the ends of the auxiliary windings 21 and 22 to provide a unidirectional current that varies with the output current of the main transformer and to supply this unidirectional current directly through the loop circuit including conductor 38, auxiliary winding 22, auxiliary winding 21, and conductor 39. The alternating-current side of the rectifier 37 is supplied through conductors 42 and 43 from a secondary winding 44 of the current transformer having a primary winding 45 connected through conductor 46 between the rectifier 37 and the arc electrode 25. The rate of increase in unidirectional current through the windings 21 and 22 may be adjusted by adjusting the rheostat 41 connected across the output terminals of the rectifier 37. In the arrangement of the circuit shown in Fig. 4, the saturating windings 32 and 34 employed in Fig. 3 are eliminated, and the saturating effect resulting from both the alternating current and the unidirectional current is effected by combining the flow of both these currents through the same auxiliary windings 21 and 22. Obviously other types of rectifiers than that shown, such as grid controlled rectifier tubes might be employed for supplying a unidirectional current to the saturating windings.

Modifications in the circuits and apparatus from that shown and described will occur to those skilled in the art, and I do not wish to be limited otherwise than by the scope of the appended claims.

I claim as my invention:

1. In a transformer, a magnetic core structure having five leg members all connected at their ends by two yoke members, main primary and secondary windings inductively related to said core, one of said main windings surrounding three of said leg members, the other of said main windings surrounding one only of said leg members, and two auxiliary windings surrounding the other two of said three winding leg members, the auxiliary windings being connected in parallel circuit with each other and so connected in series circuit with the above named winding surrounding one winding leg only that the voltages of the parallel connected windings are in opposition to the voltage of the main winding surrounding one winding leg only.

2. In a transformer, a magnetic core structure having five leg members all connected at their ends by two yoke members, main primary and secondary windings inductively related to said core, one of said main windings surrounding three of said leg members, the other of said main windings surrounding one only of said leg members, and two auxiliary windings surrounding the other two of said three winding leg members, the auxiliary windings being connected in parallel circuit with each other and so connected in series circuit with the above named winding surrounding one winding leg only that the voltages of the parallel connected windings are in opposition to the voltage of the main winding surrounding one winding leg only, the winding legs upon which the auxiliary windings are wound being of lesser cross section than the winding leg upon which the other of said two main windings is wound.

3. In a transformer, a magnetic core structure having a plurality of leg members connected at their corresponding ends by yoke members, said plurality of leg members including a main winding leg member and two auxiliary winding leg members, two main primary and secondary inductively related windings, one of said windings surrounding all of said winding leg members, the second one of said two main windings surrounding said main winding leg member only, and auxiliary windings surrounding the auxiliary winding leg members and connected in parallel to each other and in series circuit relation with the second one of said two main windings in voltage opposition to said second one of said two main windings for decreasing the output voltage of the secondary winding circuit upon an increase in the secondary winding current, said auxiliary winding legs being designed to saturate more rapidly than the main winding leg upon an increase in secondary winding current to increase the secondary winding circuit output voltage upon an increase in secondary current.

4. In a transformer, a magnetic core structure having a plurality of leg members connected at their corresponding ends by yoke members, said plurality of leg members including a main winding leg member and two auxiliary winding leg members, a primary winding surrounding all of said winding leg members, a secondary winding surrounding said main winding leg member, auxiliary windings connected in parallel to each other and in series circuit relation with said secondary winding in voltage opposition to said secondary winding for decreasing the output voltage of the secondary winding circuit upon an increase in the secondary winding current, said auxiliary winding legs being designed to saturate more rapidly than the main winding leg upon an increase in secondary winding current to increase the secondary winding circuit output voltage upon an increase in secondary current, and means for varying the rate of saturation of the auxiliary winding legs comprising means for developing a unidirectional current that varies in response to changes in the secondary circuit current for correspondingly changing the saturation of the auxiliary winding legs to vary the output voltage of the secondary circuit upon changes in the secondary circuit current therethrough.

5. In a transformer, a magnetic core structure having a plurality of leg members connected at their corresponding ends by yoke members, said plurality of leg members including a main winding leg member and two auxiliary winding leg members, a primary winding surrounding all of said winding leg members, a secondary winding surrounding said main winding leg member, auxiliary windings connected in parallel to each other and in series circuit relation with said secondary winding in voltage opposition to said secondary winding for decreasing the output voltage of the secondary winding circuit upon an increase in the secondary winding current, said auxiliary winding legs being designed to saturate more rapidly than the main winding leg upon an increase in secondary winding current to increase the secondary winding circuit output voltage upon an increase in secondary current, and rectifier means energized from the secondary winding circuit for controlling the circulation of unidirectional current through said auxiliary windings in response to variations in the secondary circuit current.

6. In a transformer, a magnetic core structure having a plurality of leg members connected at their corresponding ends by yoke members, said plurality of leg members including a main winding leg member and two auxiliary winding leg members, a primary winding surrounding all of said winding leg members, a secondary winding surrounding said main winding leg member, auxiliary windings connected in parallel to each other and in series circuit relation with said secondary winding in voltage opposition to said secondary winding for decreasing the output voltage of the secondary winding circuit upon an increase in the secondary winding current, said auxiliary winding legs being designed to saturate more rapidly than the main winding leg upon an increase in secondary winding current to increase the secondary winding circuit output voltage upon an increase in secondary current, additional means for increasing the rate of change in the saturation of the auxiliary winding legs comprising saturating windings surrounding the auxiliary winding legs, and rectifier means for impressing a unidirectional voltage on the circuit of said saturating windings that varies in accordance with the current flow in the secondary winding circuit for varying the output voltage of the secondary current circuit.

7. In a transformer, a magnetic core structure having a plurality of leg members connected at their corresponding ends by yoke members, said plurality of leg members including a main winding leg member and two auxiliary winding leg members, a primary winding surrounding all of said winding leg members, a secondary winding surrounding said main winding leg member, auxiliary windings connected in parallel to each other and in series circuit relation with said secondary winding in voltage opposition to said secondary winding for decreasing the output voltage of the secondary winding circuit upon an increase in the secondary winding current; said auxiliary winding legs being designed to saturate more rapidly than the main winding leg upon an increase in secondary winding current to increase the secondary winding circuit output voltage upon an increase in secondary current, additional means for increasing the rate of change in the saturation of the auxiliary winding legs comprising a unidirectional current circuit, and rectifier means for impressing a unidirectional voltage on said circuit that varies in response to variations in the secondary circuit current.

8. In a transformer, a magnetic core structure having a plurality of leg members connected at their corresponding ends by two yoke members, a primary winding surrounding less than all of said leg members, a main secondary winding surrounding one of said leg members, and an auxiliary winding surrounding the other two of said winding leg members, the auxiliary winding being so connected in series circuit with said secondary winding that its voltage is in opposition to the voltage of the secondary winding.

9. In a transformer, a magnetic core structure having a plurality of leg members connected at their ends by yoke members, a primary winding surrounding less than all of said leg members, a main secondary winding surrounding one of said leg members, and an auxiliary winding surrounding the other two of said winding leg members, the auxiliary winding being so connected in series circuit with said secondary winding that the voltages of the two windings are in opposition, the winding leg upon which the auxiliary winding is wound being of lesser cross section than the winding leg upon which the secondary winding is wound.

10. In a transformer, a magnetic core structure having a plurality of leg members connected at their corresponding ends by yoke members, said plurality of leg members including a main winding leg member and an auxiliary winding leg member, a primary winding surrounding said wndiing leg member, a secondary winding surrounding said main winding leg member, and an auxiliary winding connected in series circuit relation with said secondary winding in voltage opposition to said secondary winding for decreasing the output voltage of the secondary winding circuit upon an increase in the secondary winding current, said auxiliary winding leg being designed to saturate more rapidly than the main winding leg upon an increase in secondary winding curren to increase the secondary winding circuit output voltage upon an increase in secondary current.

11. In a transformer, a magnetic core structure having a plurality of leg members connected at their corresponding ends by yoke members, said plurality of leg members including a main winding leg member and an auxiliary winding leg member, a primary winding surrounding said winding leg member, a secondary winding surrounding said main winding leg member, auxiliary windings connected in series circuit relation with said secondary winding in voltage opposition to said secondary winding for decreasing the output voltage of the secondary winding circuit upon an increase in the secondary winding current, said auxiliary winding leg being designed to saturate more rapidly than the main winding leg upon an increase in secondary winding current to increase the secondary winding circuit output voltage upon an increase in secondary current, and means for varying the rate of saturation of the auxiliary winding legs comprising means for developing a unidirectional current that varies in response to changes in the secondary circuit current for correspondingly changing the saturation of the auxiliary winding leg to vary the output voltage of the secondary circuit upon changes in the secondary circuit current therethrough.

EDWARD C. WENTZ.